April 12, 1960
R. H. WIDMYER
2,932,740
BORE HOLE FLUID MIXING APPARATUS
Filed April 18, 1956
2 Sheets-Sheet 2
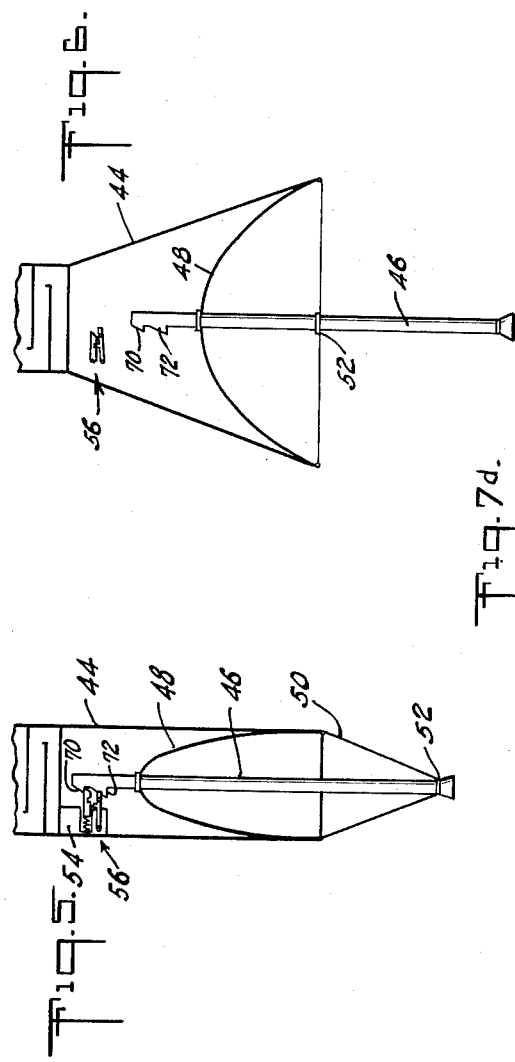
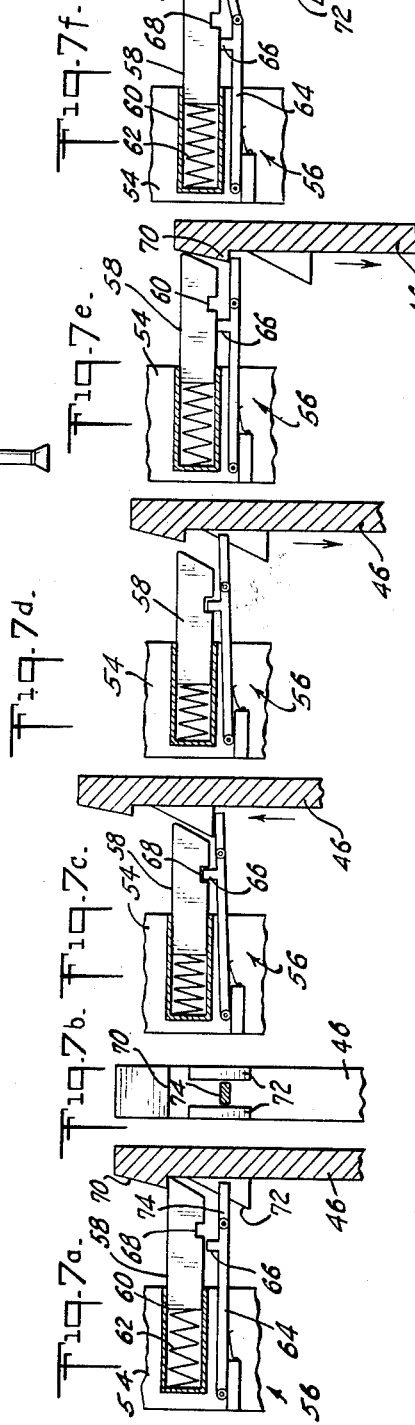

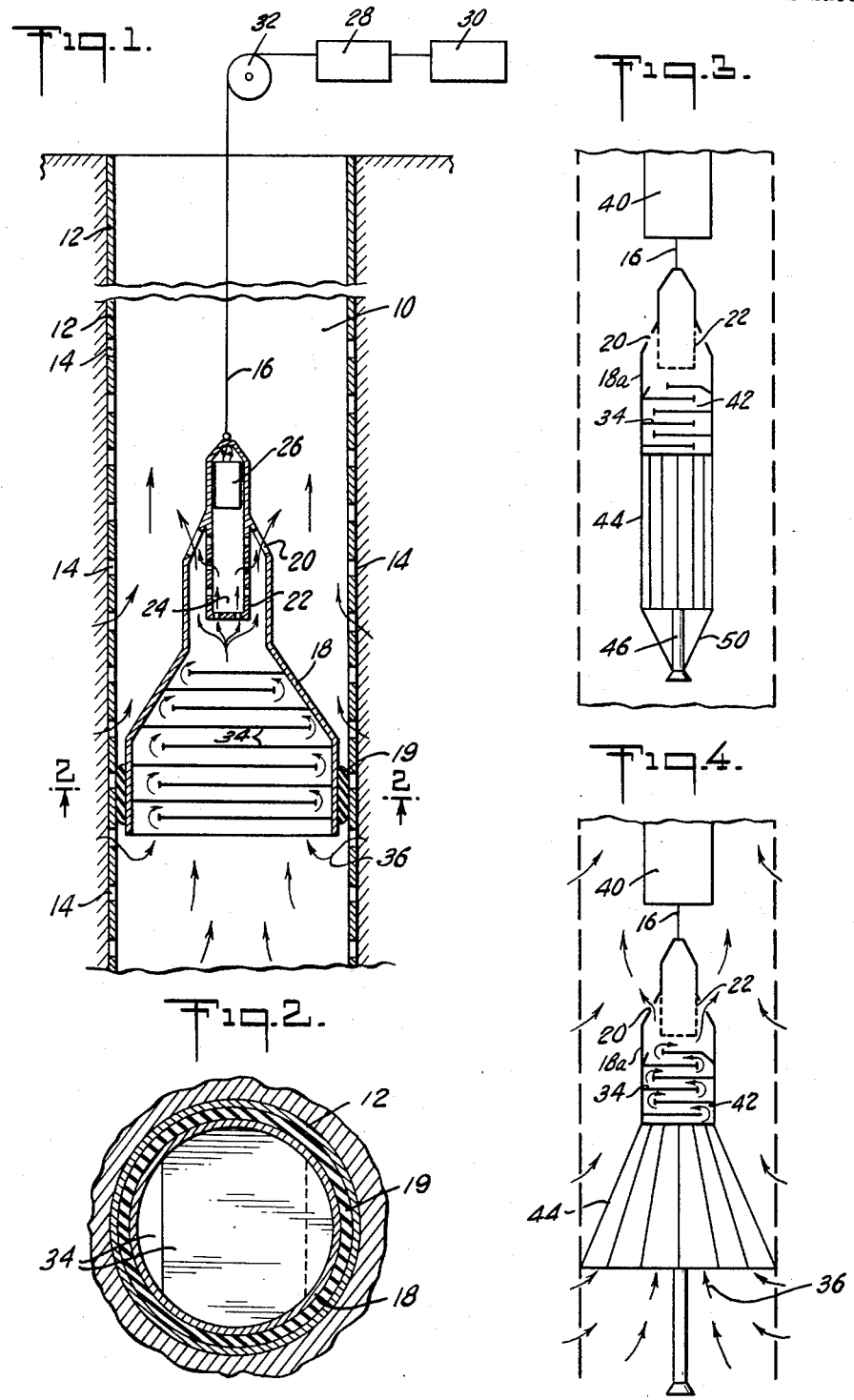

United States Patent Office 2,932,740
Patented Apr. 12, 1960

2,932,740

BORE HOLE FLUID MIXING APPARATUS

Richard Harvey Widmyer, Bellaire, Tex., assignor to Texaco Inc., a corporation of Delaware Application April 18, 1956, Serial No. 579,014

9 Claims. (Cl. 250—43.5)

This invention relates to an apparatus for measuring characteristics of fluid entering a well bore hole and more particularly to means for insuring thorough mixing of the fluid immediately prior to making the desired measurements.

In oil well production it is frequently desirable to know the depth and thickness of a producing formation from which a fluid such as gas, oil, or water or a combination thereof is entering the hole. Thus, for example, if it is found that water is entering a hole at a particular location or depth, remedial steps may be taken to stop this flow by cementing or otherwise plugging that formation. In the case of gas or oil, it is also desirable to know the location of the flow and sometimes the rate of flow from each of the producing formations. A record showing this information is frequently termed "Productivity Log."

In a copending application, Serial No. 551,756, filed December 8, 1955, by Ralph C. Reynolds and Alexander S. McKay, a method and an apparatus are disclosed for determining both the nature and rate of flow of fluid entering a well bore hole at one or more predetermined locations. In the method described in the application, the well fluid is caused to flow between a source of radioactivity and a radioactivity detector, the detector serving to measure the density of the fluid. From these measurements of density, information will be had as to whether the fluid is a gas, oil, or water or a mixture of two or all three of these. Means are also provided for measuring the rate of flow of the fluid as it enters the hole. Other devices and methods have been developed to measure certain properties of well fluids such as density, resistivity, radioactivity, etc. At various points along a producing formation, and as is indicated above, these measurements can be used to determine a productivity profile.

In making a true and accurate measurement of a characteristic of a well fluid entering a bore hole, it is essential that the fluid be thoroughly mixed before the measurement is made so that the sample being measured at that point will be truly representative of the fluid entering the hole at that point. The principal purpose of this invention is to provide an apparatus by means of which the fluid passing any particular point in the bore hole can be thoroughly mixed so that a representative sample can be measured at that point.

In carrying out the invention in one form, i.e., where the well does not contain a tubing string, the device consists of an open-bottomed shell or housing adapted to engage the walls of the bore hole or the interior of the perforated casing or liner, if such is present, and through which the well fluid is confined in its upward passage past the measuring device being used to determine the desired characteristic of the fluid. Openings are provided in the upper portion of the housing through which the fluid may pass outwardly to the hole above the housing. Also disposed in the upper portion of the housing is the measuring device which may, as indicated above, comprise a source of gamma rays and a gamma ray detector in spaced relation and through which space the fluid flows before it leaves the housing. A measuring device of this type will, of course, measure the density of the fluid. The output of the detector is conducted to the surface over the suspending cable and a record is then made of the density of the fluid in correlation with the depth of the device in the bore hole at any time. Within the lower portion of the shell or housing is a series of baffle plates forming a continuous, tortuous passage through which the fluid must flow in such a way that it will be thoroughly mixed just before the density measurement is made.

In another embodiment of the invention, a housing smaller in diameter than the one described above but containing similar fluid mixing means and density measuring means is adapted to be lowered through a string of tubing to a point below the tubing where the desired measurements are to be made. In this case the housing or shell, open at its lower end, is provided with a normally retracted or collapsed skirt member and latch means for holding the skirt in its contracted position. When the device, still in its contracted position, reaches the bottom of the bore hole the latch is disengaged permitting the skirt member to flare outwardly in a cone or umbrella shape so that its lower periphery will expand to engage the wall of the bore hole or the interior surface of the perforating casing and liner, if such is present. When in this position, any fluid entering the well below the skirt member will be caused to pass upwardly through the skirt, through the mixing device and then past the device for measuring the density or other characteristic of the fluid. Additional latch means are provided whereby, when the device is again lowered to the bottom of the hole, the skirt member will be retracted and locked in its retracted position so that it can be withdrawn through the tubing string.

For a better understanding of the invention, reference may be had to the accompanying drawing in which:

Fig. 1 is a vertical, sectional elevation through a portion of a bore hole showing an instrument embodying one form of the invention suspended therein;

Fig. 2 is a cross-sectional view taken on the line 2—2 of Fig. 1 looking in the direction of the arrows;

Fig. 3 is a diagrammatic elevation of an embodiment of the invention in which the device is shown as contracted for lowering through a tubing string;

Fig. 4 is a view of the device of Fig. 3 but in the expanded position;

Figs. 5 and 6 are schematic cross-sectional views of the means for expanding and collapsing the skirt position of the housing; and Figs. 7a through 7f show details of the latching mechanism.

Referring to the drawing and particularly to Fig. 1, a well bore hole 10 is shown as provided with a casing 12, having a portion provided with a plurality of perforations 14 through which the well fluid can enter the hole from a producing formation. Shown as suspended within the hole 10 by means of a conductor cable 16 is an open-bottomed, bell-shaped shell or housing 18, the lower, larger portion of which is slightly smaller in diameter than the casing 12. Attached to and surrounding the lower portion of the housing is a collar seal member 19 which may be of rubber, either solid or pneumatic, and which presses firmly against the side of the well bore hole or the interior of the casing but not with sufficient force to prevent movement of the assembly by virtue of its own weight. The upper end of the housing 18 is provided with one or more openings 20 through which fluid flowing upwardly may pass out through the bore hole above the housing. Also disposed in the upper portion of the housing 18 is a perforated cage member 22 which may contain any suitable instruments for measuring the desired characteristics of the fluid. In the example shown, a source 24 of gamma rays is disposed in the bottom of the cage 22 and a gamma ray detector 26 is disposed in the upper end thereof. Conductor leads extend from the detector 26 upwardly through the cable 16 to a suitable amplifier 28 connected in turn to a recording device 30 which may record the output of the detector in the form of a log on a moving tape or strip. The cable 16 passes over a suitable cable measuring device 32 which indicates or records in any well known manner the amount of cable payed out and thus the depth of the instrument in the hole at any time.

Within the lower portion of the housing 18 are a plurality of parallel, separated, alternately disposed baffle plates 34 arranged in such manner that the well fluid indicated by the arrows 36 must move through a tortuous passage on its way upwardly in the housing. In passing through and between the baffles the fluid is thoroughly mixed in a manner such that when it, or a portion of it, passes through the cage 22 the density or other characteristic of a truly representative sample will be measured.

There are, of course, many times when it is desired to make a measurement of a well mixed or representative fluid sample in a bore hole which is provided with a tubing string. In such a case, apparatus shown in Fig. 1 could not be used since it could not be run through the tubing. The invention also contemplates a collapsible mixing device which can be collapsed or retracted while being lowered through the tubing and subsequently expanded so as to engage the bore hole walls or the interior of the perforated casing. The apparatus is also adapted to be collapsed again after the measuring operation so that it can be drawn from the hole through the tubing string. Such a device is schematically illustrated in Figs. 3 through 6. In Fig. 3, the device is shown in its collapsed position as having just been lowered out of the bottom of the tubing 40. In Fig. 4, it is shown in its expanded position below the tubing and ready for the measurement of the desired characteristic of the well fluid.

As shown in Figs. 3 and 4, the housing 18a is more or less cylindrical rather than bell-shaped as in Fig. 1 and contains the measuring chamber 22 in its upper portion and the mixing chamber 42 therebelow. As was described with reference to Fig. 1, the mixing chamber 42 contains a plurality of alternately disposed baffles 34 for the purpose of mixing the fluid before it reaches the measuring chamber 22. Atttached to the lower end of the housing 18a is a collapsible shell or skirt indicated generally at 44. The shell 44 can be formed of a plurality of interleaving metal strips or a folding, flexible skin of rubber or the like. Extending downwardly within the shell 44 is a vertical tripping member 46 and a plurality of springs 48 are attached to the upper end of the tripping member and to the lower edges of the flexible strips forming the shell 44. A plurality of wires 50 are also attached to the lower end of the flexible strips and to a ring member 52 adapted to slide up and down on the tripping arm 46. It will be noted that the device 44 is somewhat in the nature of an umbrella. Attached to the lower edge of the housing 18a is a bracket 54 serving as a support for a latching and locking mechanism 56 which will be described hereinafter.

As will be noted from the description which will follow, the latching mechanism 56 serves to maintain the vertical arm 46 in its upper position with the flexible shell 44 collapsed while the device is being run into the bore hole through the tubing. When the lower end of the arm 46 strikes the bottom of the bore hole, the latch is released and the shell 44 expands into the position shown in Figs. 4 and 6. The device can then be pulled upwardly to any desired location or locations whereupon the well fluid indicated by the arrows 36 will be forced to flow upwardly through the shell 44 and into mixing chamber 42, then past the measuring device 22 and again outwardly into the bore hole as has been previously described with reference to Fig. 1. After the desired measurements have been made, the device will again be lowered to the bottom of the hole whereupon the arm 46 will again be moved upwardly and again latched in that position, the shell 44 again assuming its retracted position as shown in Figs. 3 and 5. The device can then be withdrawn from the bore hole through the tubing.

With reference to Figs. 7a through 7f, the latching and locking mechanism indicated generally at 56 can be seen to comprise a latch bar 58 adapted to move horizontally within a guide cylinder 60; a coil spring 62 serving to bias the bar toward the right. Directly below the latch 58 is a locking arm 64 hinged at its left hand end so that its right hand end can have a slight vertical movement. A projection 66 on the top of arm 64 cooperates with an indentation or notch 68 on the bottom of the latch bar 58 for a purpose which will be explained. The upper end of the tripping arm 46 is provided with a small upper tooth 70 and a slightly lower and larger tooth 72.

The position of the latching mechanism 56, when the shell 44 is collapsed, is shown in Fig. 7a. The latch bar 58 is extended by the spring 62 and engages the upper tooth 70 on the tripping arm 46 thereby preventing the arm 46 from moving down and the shell 44 from expanding. In order to release the upper tooth 70 and permit the shell 44 to expand, the vertical tripping arm 46 is first moved upward by bringing it in contact with the bottom of the bore hole. As shown in Fig. 7c, the larger tooth 72 is thereby moved upwardly and this engages and pushes the latch bar 58 backwardly to a position where the notch 68 engages the projection 66 on the locking arm 64. There is, of course, sufficient flexibility in the shell 44 to permit this slight additional upward movement of the arm 46. With the latch bar 58 held in its retracted position as shown in Fig. 7c, the vertical arm 46 is free to move down and allow the shell 44 to expand as the device is raised as shown in Fig. 7d. As illustrated in the side view of Fig. 7b, the larger tooth 72 is split vertically and therefore the downward movement of the arm 46 does not disturb the locking arm 64. As the arm 46 moves down the smaller upper tooth 70 engages the end of the locking arm 64 moving it slightly downward to release projection 66 from notch 68, thus allowing the latch bar 58 to again move towards the right as shown in Fig. 7e. Sufficient downward swing is available in the locking arm 64 to permit upper tooth 70 to continue its downward movement once it has caused the locking arm 64 to disengage the latch bar 58. In order to collapse the shell 44, the entire device is again lowered to the bottom of the hole thereby moving the arm 46 upwardly. A short one-way hinged end 74 on the locking arm 64 allows the upper tooth 70 to pass that point without disturbing the mechanism as shown in the Fig. 7f. The latch bar 58 is temporarily moved to the left until the tooth 70 is above the end of the latch bar at which point it is held by the latch bar in the position shown in Fig. 7a. At that time the shell 44 is again collapsed as shown in Figs. 3 and 5.

There are, of course, other latching mechanisms which could be used to permit the shell to be expanded and collapsed at will, the form which has been described merely being given as one example.

It will be seen that an apparatus has been provided by means of which well fluid can be intimately mixed so that samples of the fluid in the measuring chamber will be truly representative of the total fluid production below any point in the well at which the device is positioned.

Obviously many modifications and variations of the invention as hereinabove set forth may be made without departing from the spirit and scope thereof and there-

I claim:

1. An apparatus for measuring a characteristic of fluid flowing into a well bore hole from a producing formation comprising an open-bottomed housing adapted to be passed through the hole while suspended from a conductor cable, a resilient sealing member surrounding said housing and adapted to engage the walls of the bore hole, so that fluid entering the hole below the housing will be forced to pass upwardly through the housing and then outwardly through openings in the upper portion of the housing into the space above the housing, means in the upper portion of the housing for measuring the desired characteristic of said fluid and means within the housing for mixing the fluid passing therethrough before it reaches said measuring means, comprising a plurality of alternately disposed baffle plates defining a tortuous passage in which the fluid is confined in its upward flow.

2. An apparatus as described in claim 1 in which the housing is bell-shaped in vertical cross section, said baffle plates extending substantially horizontally across the lower and larger portion of the bell.

3. An apparatus as described in claim 1 in which the measuring means comprises a source of gamma rays and a gamma ray detector separated by a space, at least part of the mixed fluid flowing through said space before leaving the housing, and means for recording the output of said detector.

4. An apparatus for measuring a characteristic of fluid flowing into a well bore hole below a string of tubing therein, comprising a vertically elongated open-bottomed housing member adapted to be lowered through said tubing while suspended from a conductor cable, means in the upper portion of the housing for measuring the desired fluid characteristic, means disposed in the housing below said measuring means for mixing fluid passing upwardly through the housing, an expansible shell attached to the lower end of the housing and adapted, when the housing is below said tubing, to expand into engagement with the bore hole walls so that fluid entering the hole below the housing will be forced to pass upwardly into said shell, then through said mixing means and past said measuring means into the space above the housing.

5. An apparatus as described in claim 4 including latch means for maintaining said shell in retracted position and means adapted, when contacting the bottom of the bore hole to trip said latch means to permit said shell to expand into engagement with the bore hole walls.

6. An apparatus as described in claim 5 including shell retracting means and a latch holding member adapted, when said tripping means again contacts the bottom of the bore hole, to re-engage said latch means to lock said shell in its retracted position so that it can be withdrawn upwardly through said tubing.

7. An apparatus for measuring a characteristic of fluid flowing into a well bore hole from a producing formation comprising an open-bottomed housing adapted to be passed through said bore hole while suspended from an conductor cable, means joined to said housing adjacent the open bottom thereof adapted to engage the wall of said bore hole so that fluid entering said bore hole below said housing therein will be forced thereby to pass upwardly through said housing and then outwardly through openings in the upper portion of said housing into the space thereabove, means in the upper portion of said housing for measuring the desired characteristic of said fluid, and means within said housing for mixing the fluid passing therethrough before it reaches said measuring means, comprising a plurality of separate and alternately disposed baffle plates defining a passage for reversing the direction of flow of said fluid.

8. An apparatus as defined in claim 4 wherein said mixing means comprises a plurality of alternately disposed and separated baffle plates forming the walls of a tortuous passage in which the fluid is confined in its upward flow.

9. An apparatus as defined in claim 8 wherein said measuring means comprises a source of gamma rays and a gamma ray detector spaced therefrom whereby part of the mixed fluid flows between said source and said detector before leaving said housing member, and means for recording the output of said detector.

References Cited in the file of this patent

UNITED STATES PATENTS

| | | |
|---|---|---|
| 2,228,623 | Ennis | Jan. 14, 1941 |
| 2,425,868 | Dillon | Aug. 19, 1947 |
| 2,433,718 | Teplitz | Dec. 30, 1947 |
| 2,599,975 | Carpenter | June 10, 1952 |